(12) United States Patent
Wada

(10) Patent No.: US 10,688,587 B2
(45) Date of Patent: Jun. 23, 2020

(54) WIRE AIMING GUIDE AND WELDING DEVICE

(71) Applicant: TAIYO NIPPON SANSO CORPORATION, Tokyo (JP)

(72) Inventor: Katsunori Wada, Kai (JP)

(73) Assignee: TAIYO NIPPON SANSO CORPORATION, Tokyo (JP)

( * ) Notice: Subject to any disclaimer, the term of this patent is extended or adjusted under 35 U.S.C. 154(b) by 345 days.

(21) Appl. No.: 15/552,317

(22) PCT Filed: Feb. 9, 2016

(86) PCT No.: PCT/JP2016/053787
§ 371 (c)(1),
(2) Date: Aug. 21, 2017

(87) PCT Pub. No.: WO2016/136459
PCT Pub. Date: Sep. 1, 2016

(65) Prior Publication Data
US 2018/0036825 A1 Feb. 8, 2018

(30) Foreign Application Priority Data
Feb. 26, 2015 (JP) .................. 2015-036958

(51) Int. Cl.
*B23K 9/28* (2006.01)
*B23K 9/12* (2006.01)
(Continued)

(52) U.S. Cl.
CPC ............ *B23K 9/122* (2013.01); *B23K 9/1093* (2013.01); *B23K 9/167* (2013.01); *B23K 9/173* (2013.01);
(Continued)

(58) Field of Classification Search
CPC ...... B23K 10/02; B23K 9/1093; B23K 9/122; B23K 9/167; B23K 9/173; B23K 9/29; B23K 9/295; B23K 9/296
(Continued)

(56) References Cited

U.S. PATENT DOCUMENTS 1,362,491 A 12/1920 Kenyon
2,778,099 A * 1/1957 Anderson ............. B23K 9/167
228/244

FOREIGN PATENT DOCUMENTS

JP 48-025018 3/1973
JP 50-155328 12/1975
(Continued)

OTHER PUBLICATIONS

Office Action issued in JP Appln. No. 2017-204685 dated Sep. 11, 2018 (w/ translation).
(Continued)

Primary Examiner — Sang Y Paik
(74) Attorney, Agent, or Firm — Nixon & Vanderhye P.C.

(57) ABSTRACT

According to the present invention, there is provided a wire aiming guide capable of further improving usability. The present invention provides a wire aiming guide (1) configured to guide a welding wire (W) and feed the welding wire from a tip side thereof while being attached to a welding torch including: a first guide member (2) and a second guide member (3) configured to guide the welding wire (W): and a connecting portion (5) rotatably connecting the first guide member (2) and the second guide member (3), wherein a direction of the welding wire (W) fed from a tip end side of the first guide member (2) is adjusted by bending the first guide member (2) with respect to the second guide member (3).

9 Claims, 21 Drawing Sheets

(51) Int. Cl.
*B23K 9/167* (2006.01)
*B23K 9/173* (2006.01)
*B23K 10/02* (2006.01)
*B23K 9/29* (2006.01)
*B23K 9/10* (2006.01)

(52) U.S. Cl.
CPC ............... *B23K 9/29* (2013.01); *B23K 9/295* (2013.01); *B23K 9/296* (2013.01); *B23K 10/02* (2013.01)

(58) Field of Classification Search
USPC .................. 219/136–137.61, 137.8, 138
See application file for complete search history.

(56) References Cited

FOREIGN PATENT DOCUMENTS

| | | |
|---|---|---|
| JP | 51-094448 | 8/1976 |
| JP | 53-160428 | 12/1978 |
| JP | 56-142881 | 10/1981 |
| JP | 58-066083 | 5/1983 |
| JP | 60-56181 | 4/1985 |
| JP | 63-192571 | 8/1988 |
| JP | 03-297568 | 12/1991 |
| JP | 05-096376 | 4/1993 |
| JP | 11-342471 | 12/1999 |
| JP | 2013-039623 | 2/2013 |
| JP | 2014-198342 | 10/2014 |

OTHER PUBLICATIONS

Notice of Allowance issued in JP Appln. No. 2017-204685 dated Mar. 12, 2019 (w/ translation).

International Search Report for PCT/JP2016/053787, dated May 17, 2016, 4 pages.

* cited by examiner

WIRE AIMING GUIDE AND WELDING DEVICE

The present invention relates to a wire aiming guide and a welding device. This application is the U.S. national phase of International Application No. PCT/JP2016/053787 filed Feb. 9, 2016, which designated the U.S. and claims priority to Japanese Patent Application No. 2015-036958 filed on Feb. 26, 2015, the entire contents of each of which are incorporated herein by reference.

TECHNICAL FIELD OF THE INVENTION

The present invention relates to a wire aiming guide and a welding device. Priority is claimed on Japanese Patent Application No. 2015-036958 filed on Feb. 26, 2015, the contents of which are incorporated herein by reference.

RELATED ART

For example, for welding a structure (workpiece) using a metal or a nonferrous metal as a base material, non-consumable electrode type gas shield arc welding, which is called GTAW (Gas Tungsten Arc welding), such as TIG welding (Tungsten Inert Gas welding), and plasma arc welding, has been used.

Consumable electrode type gas shield arc welding, which is called GMAW (Gas Metal Arc welding), such as MIG welding (Metal Inert Gas welding), MAG welding (Metal Active Gas welding) and carbon dioxide gas arc welding, has been also used. Consumable electrode type gas shielded arc welding is also called semi-automatic arc welding, because welding is performed manually while automatically feeding a welding wire as a consumable electrode.

In these welding methods, welding is generally performed by generating an arc between the electrode and the workpiece with a welding torch, melting the workpiece by heat of the arc, and forming a molten pool. In addition, welding is performed by discharging shielding gas from a torch nozzle surrounding the electrode, and shielding the atmosphere (air) with the shielding gas.

By the way, in these welding methods, when a groove or a fillet is welded, a welding wire (also referred to as a filler) which is a filler metal is supplied and insufficient weld metal is supplied in order to secure a predetermined leg length and a throat thickness (For example, see Patent Documents 1 to 5).

In this case, it is necessary to accurately supply the welding wire toward the molten pool directly under the arc. For this reason, a wire aiming guide (also called a filler guide) is attached to the welding torch and the welding wire is fed from the tip end of the wire aiming guide toward the molten pool.

The wire aiming guide has a feeding head configured to feed the welding wire from the tip end side while guiding the welding wire and a liner (also referred to as a conduit) configured to feed the welding wire toward the tip end portion of the feeding head. The wire aiming guide has a structure in which the feeding head is attached to the welding torch via an attachment jig.

The feed head has a nozzle shape of which the tip end side is curved toward the tip side of the torch nozzle. On the other hand, the liner is connected to a wire feeding device, and the welding wire can be automatically fed by the wire feeding device.

On the other hand, there is a method called a hot wire that passes current to a welding wire. In this method, the welding wire is heated by the electric resistance between the feed portion on the side of the wire aiming guide and the base material, further promoting the melting of the welding wire. As a result, high deposition rate welding and high speed welding become possible.

PRIOR ART LITERATURE

Patent Literature

[Patent Document 1] Japanese Unexamined Utility Application, First Publication No. S58-066083
[Patent Document 2] Japanese Unexamined Patent Application, First Publication No. S51-094448
[Patent Document 3] Japanese Unexamined Utility Application, First Publication No. S53-160428
[Patent Document 4] Japanese Unexamined Patent Application, First Publication No. H05-096376
[Patent Document 5] Japanese Unexamined Patent Application, First Publication No. 2013-039623

DISCLOSURE OF THE INVENTION

Problems to be Solved by the Invention

In the conventional wire aiming guide described above, since the feeding head is curved, there was a problem that it is difficult to insert the welding wire into the feeding head.

In addition, there is a wire aiming guide provided with a rotating mechanism for rotatably supporting the feed head on the attachment jig so that the angle of the feed head can be adjusted. However, in such a wire aiming guide capable of adjusting the angle, since the nozzle of the welding torch needs a large area, there arises a problem that the approach to the narrow portion becomes difficult.

The present invention has been proposed in view of such conventional circumstances, and an object of the present invention is to provide a wire aiming guide capable of further improving usability, a welding device in which such a wire aiming guide is attached to a welding torch.

Means for Solving the Problem

In order to achieve the object, the present invention provides following wire aiming guides and welding devices.
(1) A wire aiming guide configured to guide a welding wire and feed the welding wire from a tip side thereof while being attached to a welding torch including:
a first guide member and a second guide member configured to guide the welding wire: and
a connecting portion rotatably connecting the first guide member and the second guide member,
wherein a direction of the welding wire fed from a tip end side of the first guide member is adjusted controlled by bending the first guide member with respect to the second guide member.
(2) The wire aiming guide according to (1), wherein a nozzle portion configured to penetrate the welding wire is provided on the tip side of the first guide member, and the welding wire is fed out from the tip of the nozzle portion.
(3) The wire aiming guide according to (1) to (2), wherein a first guide configured to guide the welding wire toward the nozzle portion side is provided with the first guide member.
(4) The wire aiming guide according to (3), wherein the first guide portion is positioned on both sides of the welding wire so as to sandwich the welding wire, and the welding wire is guided toward the nozzle portion side in a state of being sandwiched by the first guide portion.

(5) The wire aiming guide according to any one of (1) to (4), wherein the wire aiming guide further includes a liner configured to feed the welding wire in a state of being connected to the base end side of the second guide member.

(6) The wire aiming guide according to (5), wherein the second guide member is provided with a second guide portion configured to guide the welding wire fed from the liner.

(7) The wire aiming guide according to (6), wherein the second guide portion is disposed on both sides of the welding wire so as to sandwich the welding wire, and the welding wire is guided toward the first guide member side in a state of being sandwiched by the second guide portion.

(8) The wire aiming guide according to any one of (1) to (7), wherein the wire aiming guide further includes a fixing portion configured to fix the first guide member to the second guide member.

(9) The wire aiming guide according to any one of (1) to (8), wherein the wire aiming guide further includes an attaching portion configured to attach the second guide member to the welding torch.

(10) A wire aiming guide configured to guide a welding wire and feed out the welding wire from a tip side thereof while being attached to a welding torch including:

a guide member including a first guide portion and a second guide portion which guide the welding wire, and a liner configured to feed the welding wire in a state of being connected to the base end side of the guide member, wherein the first guide portion is located at the tip end side of the guide member than the second guide portion and is located biased with respect to the extension direction of the welding wire fed from the liner than the second guide portion; and the welding wire is bent with the second guide portion as a fulcrum and is fed out to the distal end side of the guide member in a state in which the welding wire is hooked on the first guide portion.

(11) The wire aiming guide according to (10), wherein the wire aiming guide further includes an attaching portion configured to attach the guide member to the welding torch.

(12) A welding device including a welding torch and a wire aiming guide according to any one of the above (1) to (11).

Advantageous Effects of Invention

As described above, according to the present invention, it is possible to provide a wire aiming guide which can further improve usability, and a welding device in which such a wire aiming guide is attached to a welding torch.

EMBODIMENTS OF THE INVENTION

Hereinafter, the wire aiming guide and the welding device according to the present invention will be described in detail with reference to the drawings.

In this embodiment, a welding device which performs semi-automatic TIG welding while automatically feeding a welding wire (filler) as a filler material by attaching a wire aiming guide (filler guide) to the TIG welding torch will be explained.

(Welding Torch)

Figure 1A:
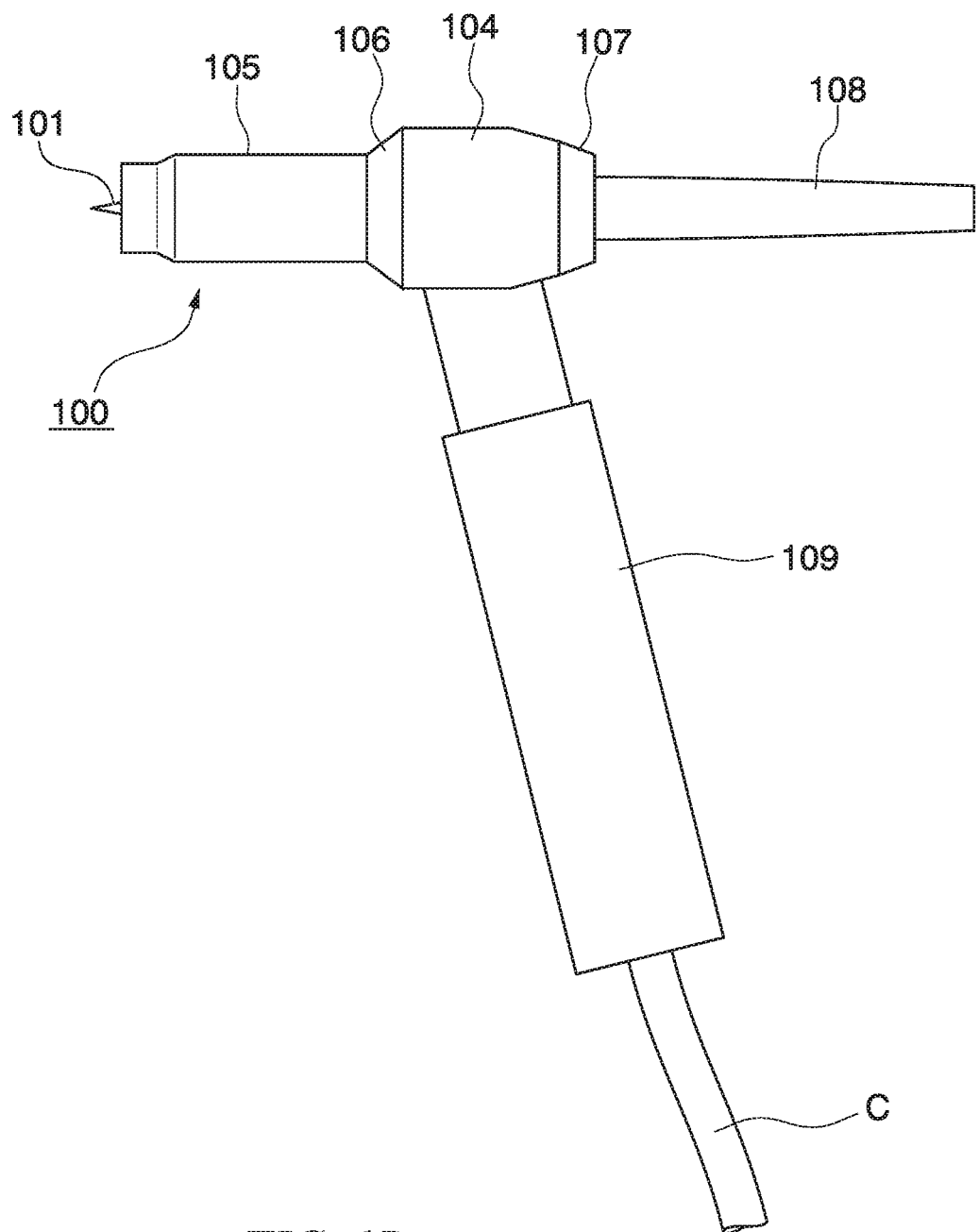
FIG. 1A is a side view showing an example of a torch for TIG welding.
Figure 1B:
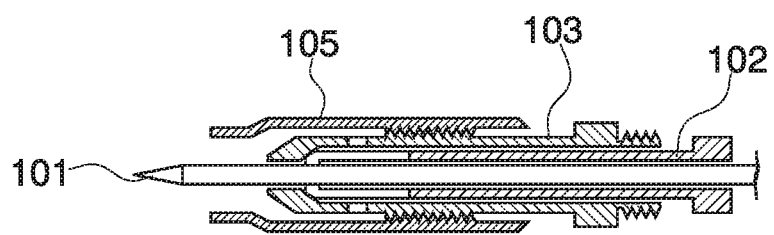
FIG. 1B is a cross-sectional view showing a main part of the torch for TIG welding shown in FIG. 1A.

First, as shown in FIGS. 1A and 1B, one example of the TIG welding torch 100 will be described. FIG. 1A is a side view showing one embodiment of the TIG welding torch 100, and FIG. 1B is a cross-sectional view showing a main part of the TIG welding torch 100 shown in FIG. 1A.

As shown in FIGS. 1A and 1B, the TIG welding torch 100 includes a non-consumable electrode 101 for generating an arc between the non-consumable electrode 101 and a workpiece, a collet 102 for supporting the non-consumable electrode 101 in a state in which the non-consumable electrode 101 is inserted into the collet 102, a collet body 103 on the inside of which the collet 102 is held in a state of projecting the non-consumable electrode 101 from the tip end side, a torch body 104 to which the collet body 103 is attached, a torch nozzle 105 which is attached on the collet body 103 in a state of surrounding the non-consumable electrode 101, and emits a shield gas toward a molten pool of a workpiece generated by the arc, a front gasket 106 which is disposed between the torch body 104 and the torch nozzle 105, a torch cap 108 which is attached in a state of disposing a rear side gasket 107 between the torch body 104 and the torch cap 108; and a handle 109 on which the torch body 104 is attached and which a user holds.

When the TIG welding torch 100 explained above is used, welding is performed by connecting a welding cable C, emitting a shield gas, which is supplied from the welding cable C, from the torch nozzle 105 while generating an arc between the non-consumable electrode 101 and the workpiece by electric power supplied from the welding cable C.

The other end of the welding cable C is connected to a welding power supply device (not shown in figures), and power and shielding gas can be supplied from the welding power supply device to the TIG welding torch 100 via the welding cable C. Examples of the shielding gas include an inert gas such as argon and helium. The TIG welding torch 100 is not limited to the handle type one described above, and may be a pencil type torch.

Wire Aiming Guide and Welding Device

First Embodiment

Figure 2:
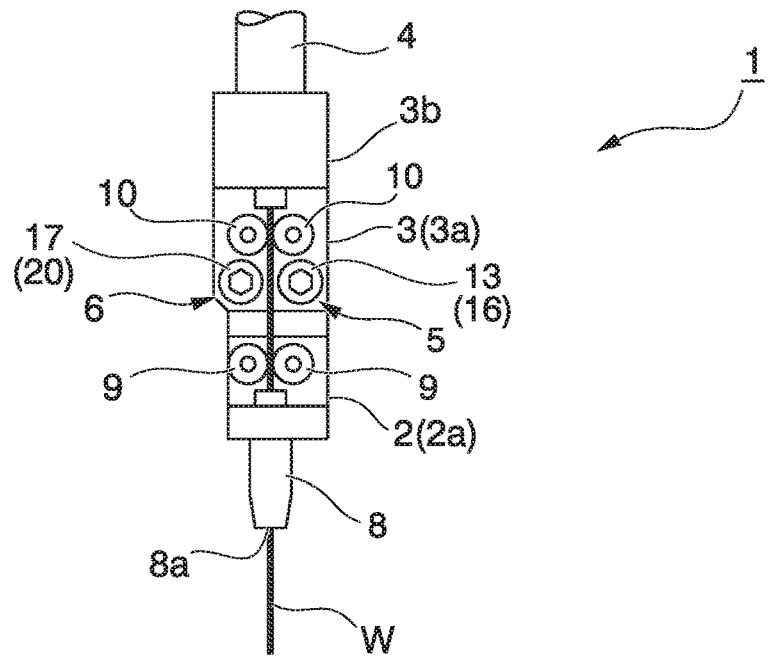
FIG. 2 is a plan view showing a configuration of a wire aiming guide according to a first embodiment of the present invention.
Figure 3:
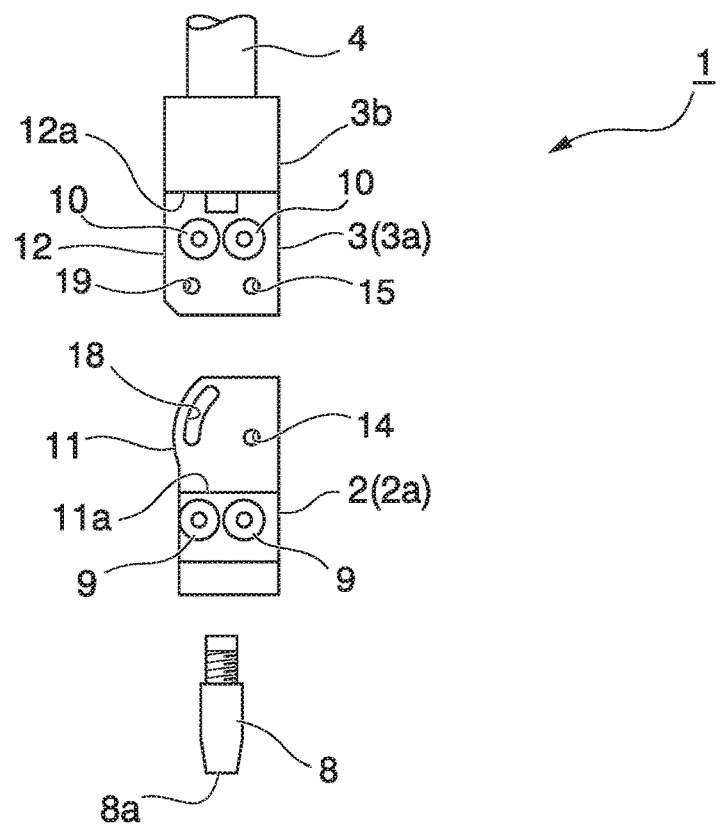
FIG. 3 is an exploded plan view showing a configuration of the wire aiming guide shown in FIG. 2.
Figure 4:
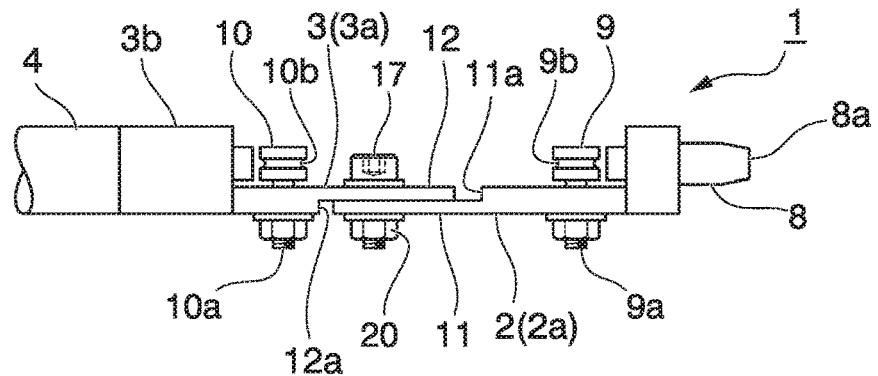
FIG. 4 is a side view showing a configuration of a wire aiming guide shown in FIG. 2.

Next, as a first embodiment of the present invention, the wire aiming guide 1 shown in FIGS. 2 to 4 will be described. FIG. 2 is a plan view showing a configuration of the wire aiming guide 1. FIG. 3 is an exploded plan view showing the configuration of the wire aiming guide 1. FIG. 4 is a side view showing the configuration of the wire aiming guide 1.

As shown in FIGS. 2 to 6, the wire aiming guide 1 includes a first guide member 2 and a second guide member 3 configured to guide a welding wire W, a liner (conduit) 4 configured to feed the welding wire W in a state in which being connected to the base end side of the second guide member 3, a connecting portion 5 for rotatably connecting the first guide member 2 and the second guide member 3, a fixing portion 6 configured to fix the first guide member 2 to the second guide member 3, and an attaching portion 7 configured to attach the second guide member 3 to the TIG welding torch 100.

The first guide member 2 is formed in a substantially rectangular flat plate shape using a material having excellent electrical conductivity and thermal conductivity, such as copper or a copper alloy. A nozzle portion 8 configured to penetrate the welding wire W is provided on the tip end side of the first guide member 2. The nozzle portion 8 has a through hole 8a penetrating it in the axial direction. The nozzle portion 8 has a shape (tapered shape) in which the tip end side gradually becomes thinner, and can be detachably attached to the main body portion 2a of the first guide member 2 by screwing a base end side thereof into the main body portion 2a.

The first guide member 2 is provided with first guide rollers (first guide portion) 9 configured to guide the welding wire W toward the nozzle portion 8 side. The first guide rollers 9 are rotatably supported on a plane parallel to one surface of the main body portion 2a by screwing the shaft portion 9a of the first guide rollers 9 to one surface of the main body portion 2a. A guide groove 9b configured to guide the welding wire W is provided on the outer peripheral surface of the first guide rollers 9.

The outer peripheral surface of the first guide roller 9, that is, the portion which is in contact with the welding wire W is made of an insulator such as ceramic or resin so that no current flows due to contact with the welding wire W. Moreover, the outer peripheral surface of the first guide roller 9, that is, the portion which is in contact with the welding wire W can be made of metal. However, when it is necessary to insulate the welding wire W from the first guide roller 9, it is desirable that the portion which is in contact with the welding wire W is made of an insulator such as ceramic or resin.

The first guide rollers 9 are arranged to face each other on so that the sides thereof sandwich the welding wire W. The clearance between the first guide rollers 9 opposed to each other is located on an extended line of the through hole 8a of the nozzle portion 8. The clearance formed between the first guide rollers 9 facing each other is substantially equal to the outer diameter of the welding wire W. As a result, the welding wire W is guided to the through hole 8*a* of the nozzle portion 8 in a state of being sandwiched between the first guide rollers 9 which are arranged to face each other.

The second guide member 3 is formed into a substantially rectangular flat plate shape having substantially the same size as the first guide member 2 using a material having excellent electrical conductivity and thermal conductivity such as copper or a copper alloy. Second guide rollers (second guide portion) 10 configured to guide the welding wire W fed from the liner 4 are provided on the base end side of the second guide member 3.

The second guide rollers 10 are rotatably supported on a plane parallel to one surface of the main body portion 3*a* by screwing the shaft portion 10*a* of the second guide rollers 10 to one surface of the main body portion 3*a*. A guide groove 10*b* configured to guide the welding wire W is provided on the outer peripheral surface of the second guide rollers 10.

The outer peripheral surface of the second guide roller 10, that is, the portion which is in contact with the welding wire W is made of an insulator such as ceramic or resin so that no current flows due to contact with the welding wire W. Moreover, the outer peripheral surface of the second guide roller 10, that is, the portion which is in contact with the welding wire W can be made of metal. However, when it is necessary to insulate the welding wire W from the second guide roller 10, it is desirable that the portion which is in contact with the welding wire W is an insulator such as ceramic or resin.

The second guide rollers 10 are arranged to face each other on both sides of the welding wire W. The space between the second guide rollers 10 opposed to each other is located on an extended line of the liner 4 attached on the base end side of the main body 3*a*. The clearance formed between the second guide rollers 10 facing each other is substantially equal to the outer diameter of the welding wire W. As a result, the welding wire W is guided to the first guide 2 side in a state of being sandwiched by the second guide rollers 10 which are arranged to face each other.

The liner 4 can be detachably attached to the extension portion 3*b* extending in the axial direction on the base end side of the main body portion 3*a* by threaded engagement. Further, the liner 4 is connected to a wire feeding device (not shown in figures), and the welding wire W can be automatically fed by the wire feeding device.

The connecting portion 5 includes a first connecting piece 11 on the base end side of the first guide member 2 and a second connecting piece 12 on the tip end side of the second guiding member 3. The first connecting piece 11 has a recess portion 11*a* having a depth corresponding to the thickness of the second connecting piece 12 on the surface of the first guide member 2 (main body portion 2*a*) which faces the second connecting piece 12. The second connecting piece 12 has a recess portion 12*a* having a depth corresponding to the thickness of the first connecting piece 11 on the side of the second guide member 3 (main body 3*a*) which faces the first connecting piece 11.

The first connecting piece 11 is provided with a first shaft hole 14 through which the supporting bolt 13 passes. The first shaft hole 14 is positioned on one side in the width direction (also called "first side in the width direction") in the plane of the first connecting piece 11 and forms a round hole which allows the shaft portion of the supporting bolt 13 to penetrate therethrough. The second connecting piece 12 is provided with a second shaft hole 15 through which the supporting bolt 13 passes. The second shaft hole 15 is positioned on the first side in the width direction in the plane of the second connecting piece 12 and forms a round hole that allows the shaft portion of the supporting bolt 13 to penetrate.

In the connecting portion 5, in a state where the first connecting piece 11 and the second connecting piece 12 are overlapped so that the recess 11*a* and the recess 12*a* face each other, and the supporting bolt 13 is passed through the first shaft hole 14 and the second shaft hole 15, the nut 16 is fastened to the tip end side of the shaft portion of the supporting bolt 13. Thus, it is possible to rotatably connect the first connecting piece 11 (the base end side of the first guide member 2) and the second connecting piece 12 (the tip end side of the second guide member 3).

In the connecting portion 5, a washer (not shown in figures) such as a plate washer or a spring washer, for example, can be appropriately disposed between the supporting bolt 13 and the nut 16 in order to maintain the fastened state between the supporting bolt 13 and the nut 16.

The fixing portion 6 has a guide slit 18 for allowing the fixing bolt 17 to pass therethrough on the side of the first connecting piece 11 and a third shaft hole 19 through which the fixing bolt 17 passes. The guide slit 18 is provided on the other side in the width direction (also called "second side in the width direction") in the plane of the first connecting piece 11, passes through the shaft portion of the fixing bolt 17, and is a circular arc elongated hole centered on the first shaft hole 14. The third shaft hole 19 is provided on the second side in the width direction in the plane of the second connecting piece 12, and forms a round hole that allows the shaft portion of the fixing bolt 17 to penetrate therethrough.

In the fixing portion 6, in a state in which the shaft portion of the fixing bolt 17 is passed through the guide slit 18 and the third shaft hole 19, the nut 20 is fastened to the tip end side of the shaft portion. Thus, it is possible to rotate the first guide member 2 with respect to the second guide member 3 in the predetermined rotation range $\theta$. That is, it is possible to bend the first guide member 2 in the predetermined angle range $\theta$ with respect to the second guide member 3.

Here, the above-mentioned range of rotation (angle range) $\theta$ is a range in which the shaft portion of the fixing bolt 17 relatively moves in the guide slit 18. Regarding this rotation range (angle range) $\theta$, when the state before the first guide member 2 is bent with respect to the second guide member 3 (the state in which the central axes of the first guide member 2 and the second guide member 3 are brought into agreement) is 0°, $\theta$ is preferably in a range of 0° to 90°, and more preferably in a range of 0° to 70°.

Further, in the fixing portion 6, it is possible to fix the first guide member 2 to the second guide member 3 by strengthening the fastening force between the fixing bolt 17 and the nut 20. As a result, it is possible to maintain the state in which the first guide member 2 is bent relative to the second guide member 3.

In the fixing portion 6, a washer (not shown in figures) such as a plate washer, a spring washer, or the like can appropriately be disposed between the fixing bolt 17 and the nut 20 in order to maintain the fastened state between the fixing bolt 17 and the nut 20.

Since the nuts 16 and 20 shown in FIG. 2 are positioned on the opposite side (back side) from the supporting bolt 13 and the fixing bolt 17, although not shown in the fixtures, for the sake of convenience, the same position as the supporting bolt 13 and the fixing bolt 17 are assigned with reference numerals.

The attaching portion 7 is an attachment jig attached to the extension portion 3*b* of the second guide member 3. As long as the attaching portion 7 can be attached to the TIG welding torch 100, the attachment structure is not particularly limited. Further, the attaching portion 7 can be detachably attached to the TIG welding torch 100. Further, it is also possible to adjust the attachment position by sliding the wire aiming guide 1 in the front-rear direction.

Figure 5:
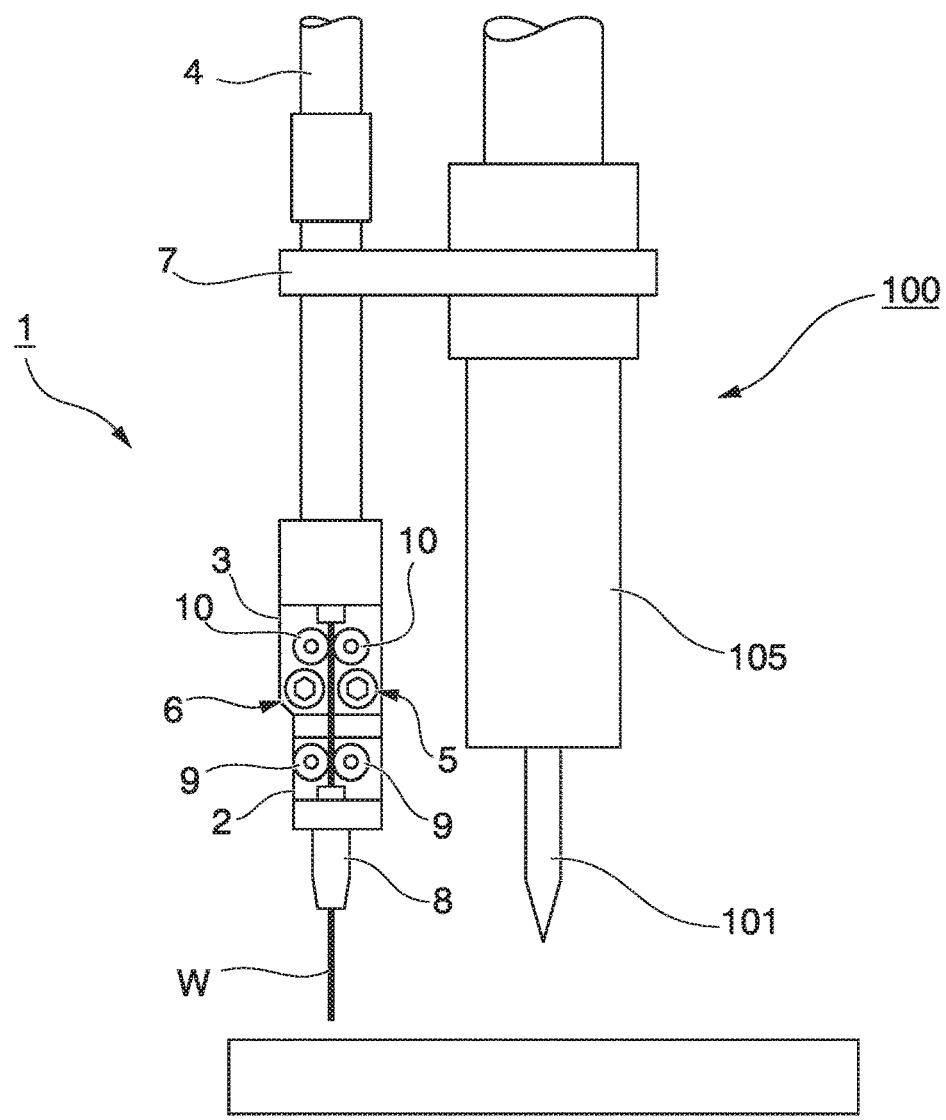
FIG. 5 is a plan view showing a state in which the wire aiming guide shown in FIG. 2 is attached to the welding torch.

As shown in FIG. 5, the wire aiming guide 1 having the above structure is attached to the TIG welding torch 100 via the attaching portion 7 so that the torch nozzle 105 and the nozzle portion 8 are aligned. Thereby, a welding device including the TIG welding torch 100 and the wire aiming guide 1 is configured.

Figure 6:
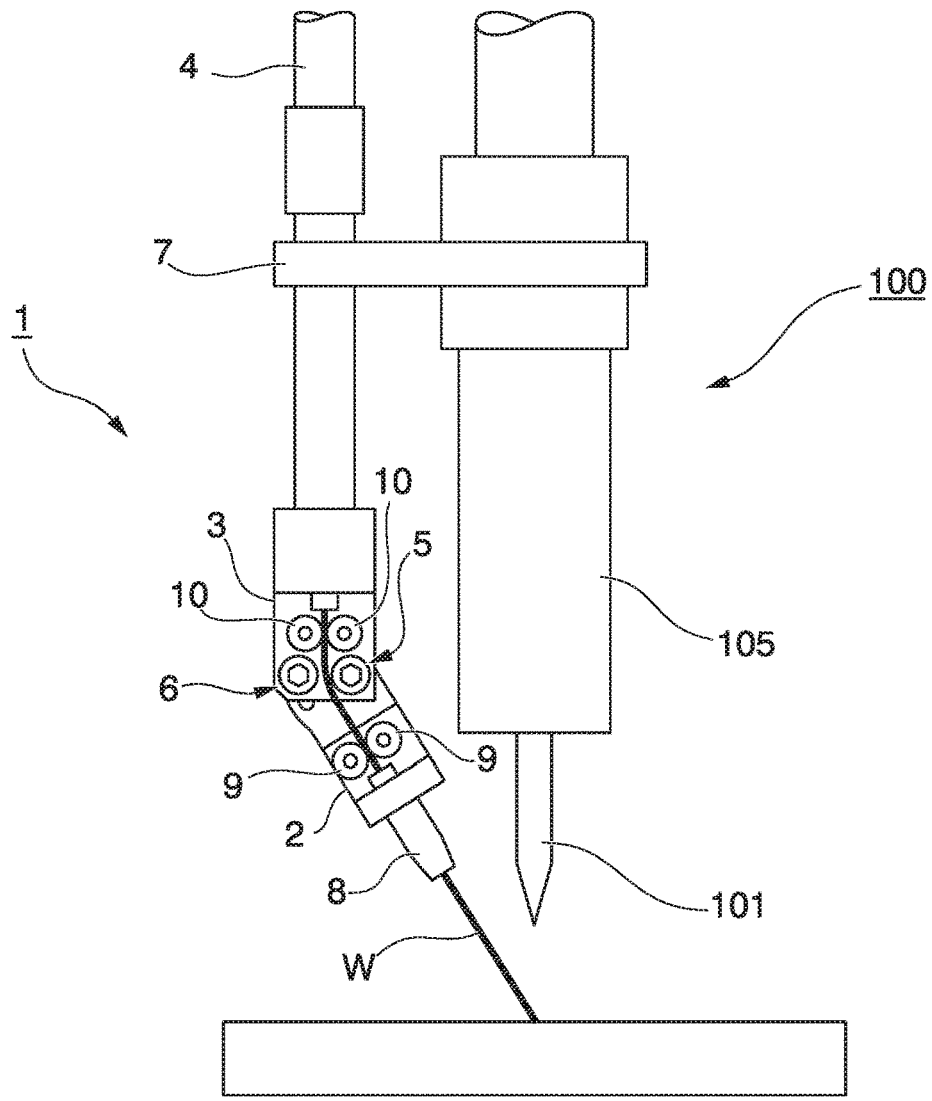
FIG. 6 is a plan view showing a state in which the first guide member is bent with respect to the second guide member in the wire aiming guide shown in FIG. 5.

In this welding device, as shown in FIG. 6, after attaching the wire aiming guide 1 to the TIG welding torch 100, the angle of the first guide member 2 with respect to the member 3 is adjusted by bending the first guide member 2 with respect to the second guide member 3. Thereby, it is possible to change (adjust) the direction of the welding wire W fed from the nozzle portion 8 of the first guide member 2. After performing such adjustment, the first guide member 2 is fixed to the second guide member 3 by the fixing portion 6.

As described above, in the wire aiming guide 1 of the present embodiment, it is possible to accurately supply the welding wire W toward the molten pool directly under the arc by adjusting the angle of the first guide member 2 with respect to the second guide member 3. Furthermore, as compared with a conventional configuration in which a rotating mechanism is provided on an attachment jig to adjust the angle of the wire aiming guide, since the wire aiming guide needs smaller area to adjust the angle and the space around the nozzle of the TIG welding torch 100 which is necessary for welding can be reduced, it is easy to approach a narrow portion.

Further, in the wire aiming guide 1 of the present embodiment, when inserting the welding wire W fed from the liner 4 into the nozzle portion 8, the first guide member 2 is not bent with respect to the second guide member 3 (that is, θ=0°). In this case, the clearance between the first guide rollers 9 which sandwich the welding wire W and the clearance between the second guide rollers 10 which sandwich the welding wire W are aligned on a straight line on the axis of the welding wire W fed from the liner 4. As a result, it is possible to easily insert the welding wire W fed from the liner 4 into the through hole 8a of the nozzle portion 8 without bending.

On the other hand, after inserting the welding wire W into the nozzle portion 8, the welding wire W can be easily bent between the first guide rollers 9 and the second guide rollers 9 which sandwich the welding wire W by bending the first guide member 2 with respect to the second guide member 3.

Figure 7:
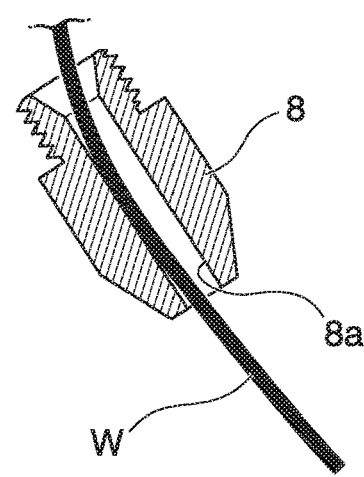
FIG. 7 is a cross-sectional view showing a state in which the welding wire is in contact with the inside of the nozzle portion in the wire aiming guide shown in FIG. 6.

Further, in the wire aiming guide 1 of the present embodiment, as shown in FIG. 7, in a state in which the first guide member 2 is bent with respect to the second guide member 3, the welding wire W can be reliably brought into contact with the inside the nozzle portion 8. In this case, in the hot wire that passes current in the welding wire W, since the position (the power supply portion) of the welding wire W which is in contact with the nozzle portion 8 is fixed, it is possible to suppress the fluctuation of the electric resistance between the feeding portion on the side of the wire aiming guide 1 and the workpiece (base material), and perform welding in a stable state.

It is to be noted that the present invention is not necessarily limited to the configuration of the wire aiming guide 1 explained above, and various modifications can be made without departing from the gist of the present invention. Hereinafter, modified embodiments of the wire aiming guide 1 will be described, but the same parts as those of the wire aiming guide 1 are not described, and the same reference numerals are attached in the drawings.

(Modification 1)

In the first modified embodiment, for example, as shown in FIGS. 8A to 8J, it is possible to appropriately change the arrangement and the number of the first guide roller 9 and the second guide roller 10 described above.

Figure 8A:
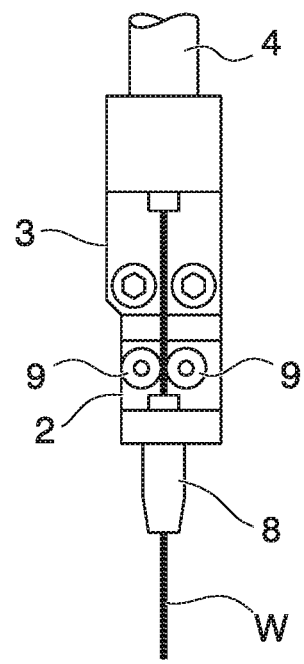
FIG. 8A is a plan view showing a first modified embodiment of the wire aiming guide shown in FIG. 2.

Specifically, as shown in FIG. 8A, it is possible to omit the second guide rollers 10 and arrange only the first guide rollers 9 in the wire aiming guide 1.

Figure 8B:
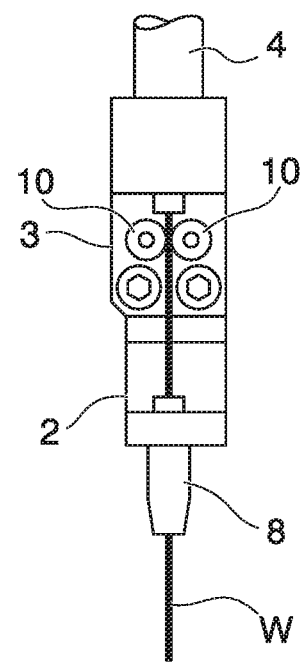
FIG. 8B is a plan view showing another first modified embodiment of the wire aiming guide shown in FIG. 2.

Further, as shown in FIG. 8B, it is possible to omit the first guide rollers 9 and to arrange only the second guide rollers 10 in the wire aiming guide 1.

Figure 8C:
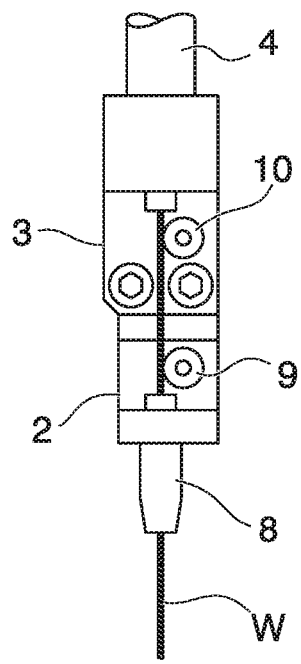
FIG. 8C is a plan view showing another first modified embodiment of the wire aiming guide shown in FIG. 2.

Further, as shown in FIG. 8C, it is also possible to arrange a first side of the first guide roller 9 and the second guide roller 10, which are arranged to face each other on both sides of the welding wire W in the wire aiming guide 1.

Figure 8D:
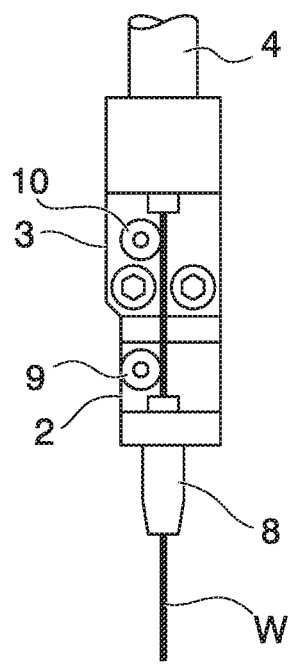
FIG. 8D is a plan view showing another first modified embodiment of the wire aiming guide shown in FIG. 2.

Further, as shown in FIG. 8D, it is also possible to arrange a second side of the first guide roller 9 and the second guide roller 10, which are arranged to face each other on both sides of the welding wire W in the wire aiming guide 1.

Figure 8E:
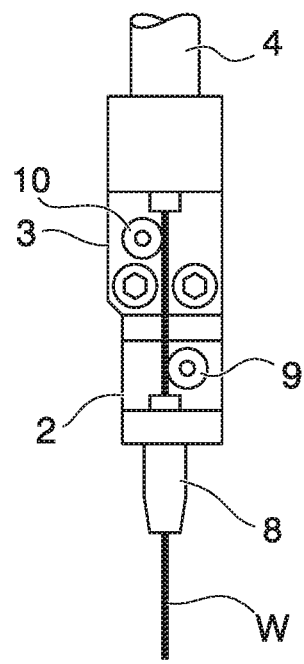
FIG. 8E is a plan view showing another first modified embodiment of the wire aiming guide shown in FIG. 2.

Further, as shown in FIG. 8E, it is also possible to arrange only the first side of the first guide roller 9 and only the second side of the second guide roller 10, which are arranged to face each other on both sides of the welding wire W in the wire aiming guide 1.

Figure 8F:
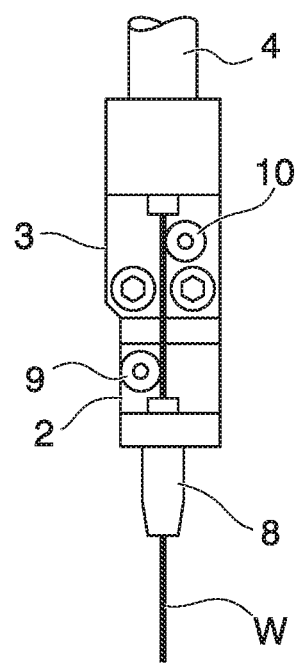
FIG. 8F is a plan view showing another first modified embodiment of the wire aiming guide shown in FIG. 2.

Further, as shown in FIG. 8F, it is also possible to arrange only the second side of the first guide rollers 9 and the first side of the second guide rollers 10, which are arranged to face each other on both sides of the welding wire W in the wire aiming guide 1.

Figure 8G:
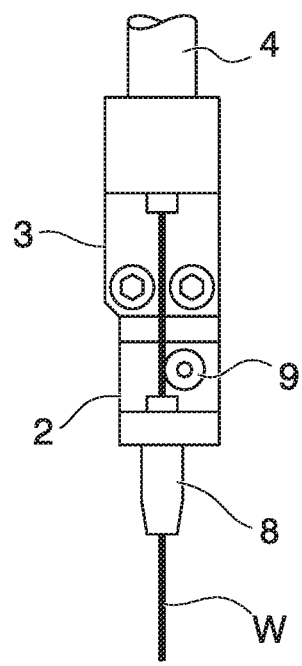
FIG. 8G is a plan view showing another first modified embodiment of the wire aiming guide shown in FIG. 2.

Further, as shown in FIG. 8G, it is also possible to arrange one of the first side and the second side of the first guide rollers 9 and omit the second guide rollers 10, which are arranged to face each other on both sides of the welding wire W in the wire aiming guide 1.

Figure 8H:
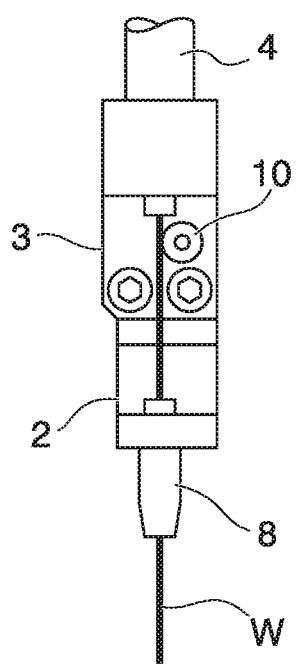
FIG. 8H is a plan view showing another first modified embodiment of the wire aiming guide shown in FIG. 2.

Further, as shown in FIG. 8H, it is also possible to arrange one of the first side and the second side of the second guide rollers 10, and omit the first guide rollers 9, which are arranged to face each other on both sides of the welding wire W in the wire aiming guide 1.

Figure 8I:
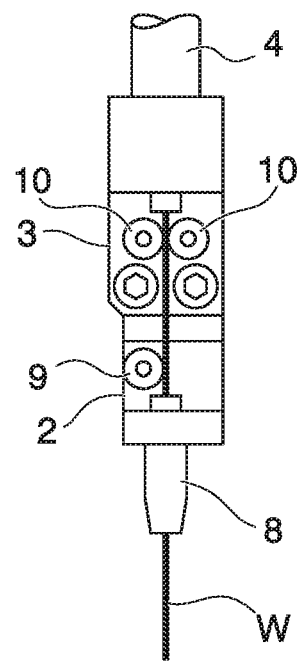
FIG. 8I is a plan view showing another first modified embodiment of the wire aiming guide shown in FIG. 2.

Further, as shown in FIG. 8I, it is possible to omit only the first side of the first guide roller 9 in the wire aiming guide 1.

Figure 8J:
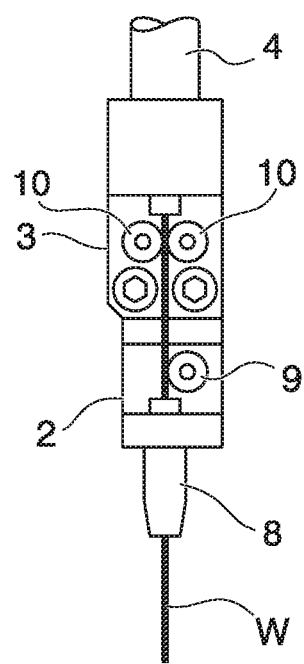
FIG. 8J is a plan view showing another first modified embodiment of the wire aiming guide shown in FIG. 2.

Further, as shown in FIG. 8J, it is possible to omit only the second side of the first guide roller 9 in the wire aiming guide 1.

In the present embodiment, the first guide roller 9 and the second guide roller 10 are used as the first guide portion and the second guide portion, but it is also possible to use a guide pin provided with a guide groove configured to guide the welding wire W instead of the rotatable guide roller.

(Modification 2)

Figure 9:
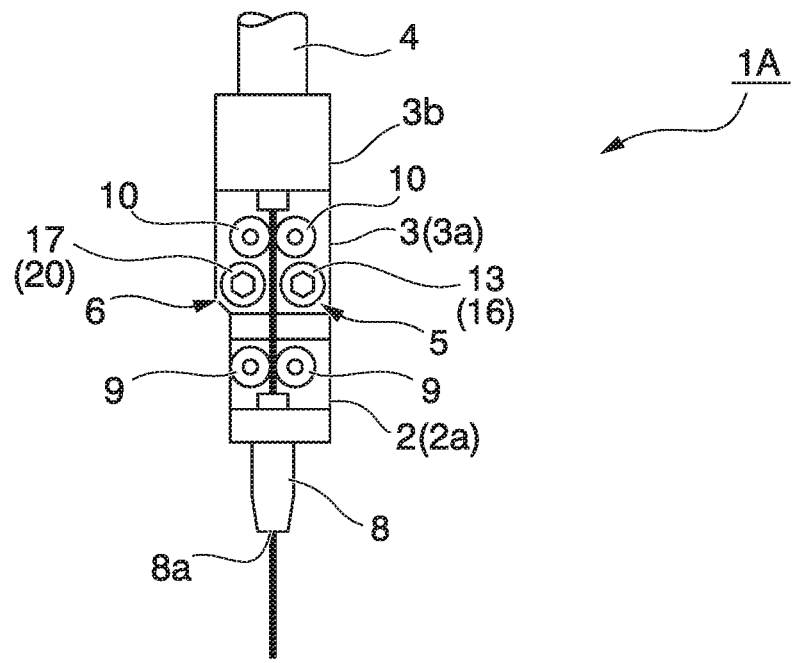
FIG. 9 is a plan view showing a configuration of a wire aiming guide according to a second modified of the wire aiming guide shown in FIG. 2.
Figure 10:
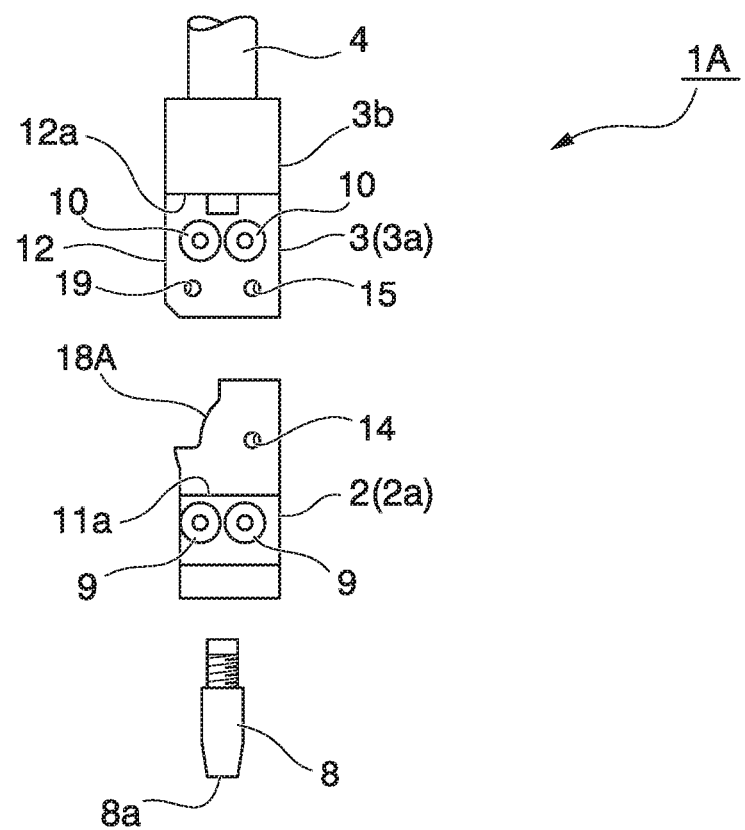
FIG. 10 is an exploded plan view showing a configuration of the wire aiming guide shown in FIG. 9.
Figure 11:
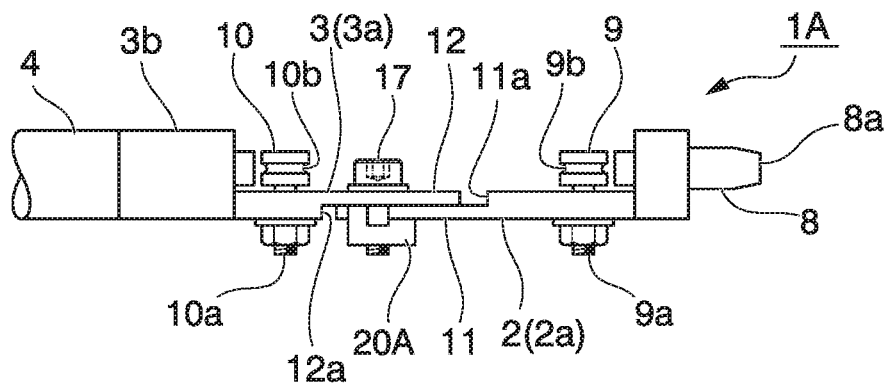
FIG. 11 is a side view showing a configuration of a wire aiming guide shown in FIG. 9.

In the second modified embodiment, it is also possible to adopt a configuration of the wire aiming guide 1A shown in FIGS. 9, 10 and 11. Specifically, as shown in FIGS. 9, 10 and 11, the wire aiming guide 1 A has a guide portion 18 A instead of the guide slit 18. The guide portion 18A is formed in a circular arc shape centered the first shaft hole 14 along the edge portion on the second side in the width direction of the first connecting piece 11. Further, in the wire aiming guide 1 A, a special nut 20 A that is brought into contact with both end portions in the direction along the guide portion 18 A is used instead of the nut 20.

In this configuration, except that the shaft portion of the fixing bolt 17 moves relatively along the guide portion 18A and the special nut 20A is brought into contact with both end portions in the direction along the guide portion 18A, the fixing portion 6 has the same configuration as that of the configuration of first embodiment. Thereby, it is possible to bend the first guide member 2 with respect to the second guide member 3 at a predetermined angle range θ. In addition, it is possible to fix the first guide member 2 to the second guide member 3 by strengthening the fastening force between the fixing bolt 17 and the special nut 20A.

(Modification 3)

Figure 12A:
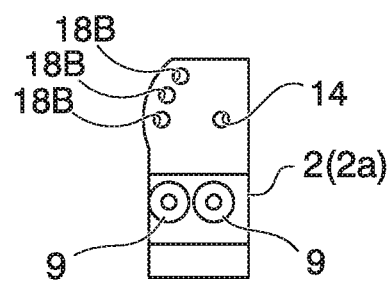
FIG. 12A is a plan view showing a third modified embodiment of the wire aiming guide shown in FIG. 2.
Figure 12B:
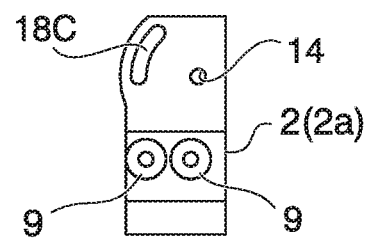
FIG. 12B is a plan view showing another third modified embodiment of the wire aiming guide shown in FIG. 2.

In the third modified embodiment, not only the configuration of the wire aiming guide 1, 1A described above, but also a configuration can be appropriately changed as shown in FIGS. 12A and 12B.

Specifically, as shown in FIG. 12A, instead of the guide slit 18, a plurality of the positioning holes 18B which are provided on the second side in the width direction in the plane of the first connecting piece 11 and arranged in a circular arc shape centered the first shaft hole 14. In this configuration, the angle θ of the first guide member 2 with respect to the second guide member 3 can be set stepwise by selecting the positioning hole 18B through which the shaft portion of the fixing bolt 17 passes from among the plurality of positioning holes 18B.

Further, as shown in FIG. 12B, instead of the guide slit 18, it is also possible to arrange a guide groove 18 which is positioned on the second side in the width direction in the plane of the first connecting piece 11, and is in a circular arc shape centered on the first shaft hole 14. In this configuration, the fixing bolt 17 and the nut 20 are omitted, and a ball type screw (not shown) is screwed with the third shaft hole 19. Thus, it is possible to bend the first guide member 2 with respect to the second guide member 3 within a range in which the ball type screw relatively moves within the guide groove 18C. Further, it is possible to fix the first guide member 2 to the second guide member 3 by tightening the ball type screw to the bottom surface of the guide groove 18C.

For the fixing bolt 17 and the nut 20, it is also possible to use a wing bolt or a wing screw that can be fastened manually. In this case, it is possible to easily fix the first guide member 2 to the second guide member 3 without using a tool.

(Modification 4)

Figure 13A:
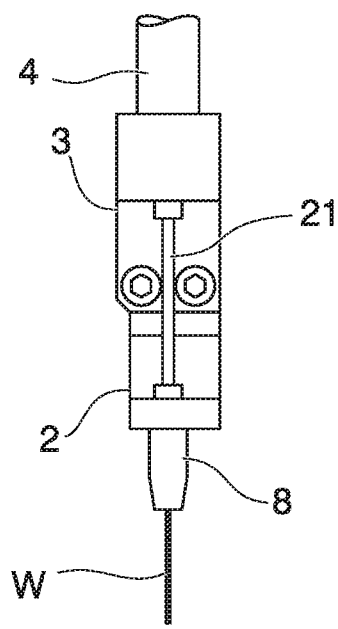
FIG. 13A is a plan view showing a fourth modified embodiment of the wire aiming guide shown in FIG. 2.
Figure 13B:
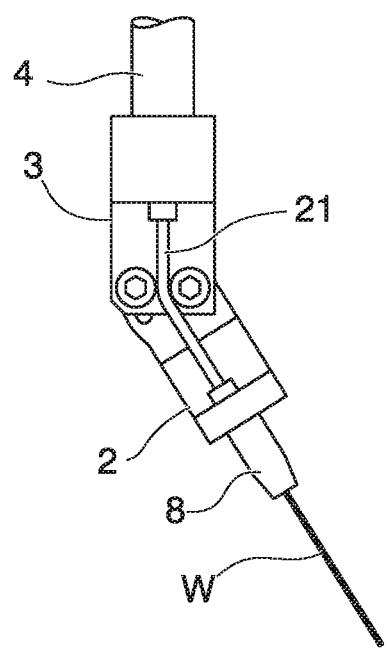
FIG. 13B is a plan view showing another fourth modified embodiment of the wire aiming guide shown in FIG. 2.

In the fourth modified embodiment, as shown in FIGS. 13A and 13B, an insulating tube 21 configured to penetrate the welding wire W can be arranged between the liner 4 and the nozzle portion 8, in addition to the configuration of the wire aiming guide 1 described above. The insulating tube 21 is arranged so as to connect between the liner 4 and the nozzle portion 8. The insulating tube 21 can be bent together with the welding wire W between the first guide member 2 and the second guide member 3. As the insulating tube 21, for example, a coil liner, a resin tube or the like can be used.

In this case, since the welding wire W is covered with the insulating tube 21, occurrence of an electric shock or spark due to contact with the welding wire W at the time of hot wire can be prevented.

(Modification 5)

Figure 14A:
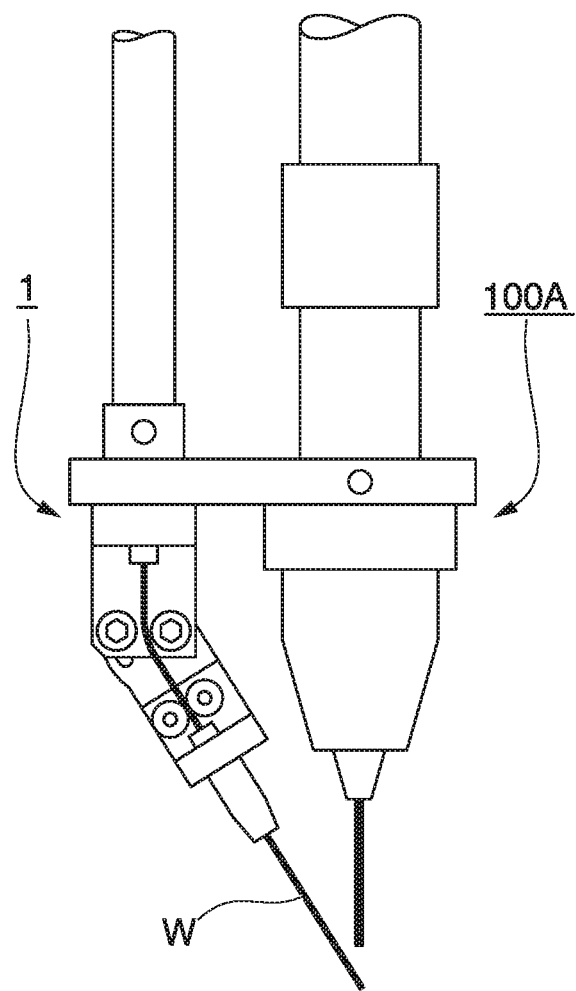
FIG. 14A is a plan view showing a welding torch attached with the wire aiming guide as a fifth modified embodiment.
Figure 14B:
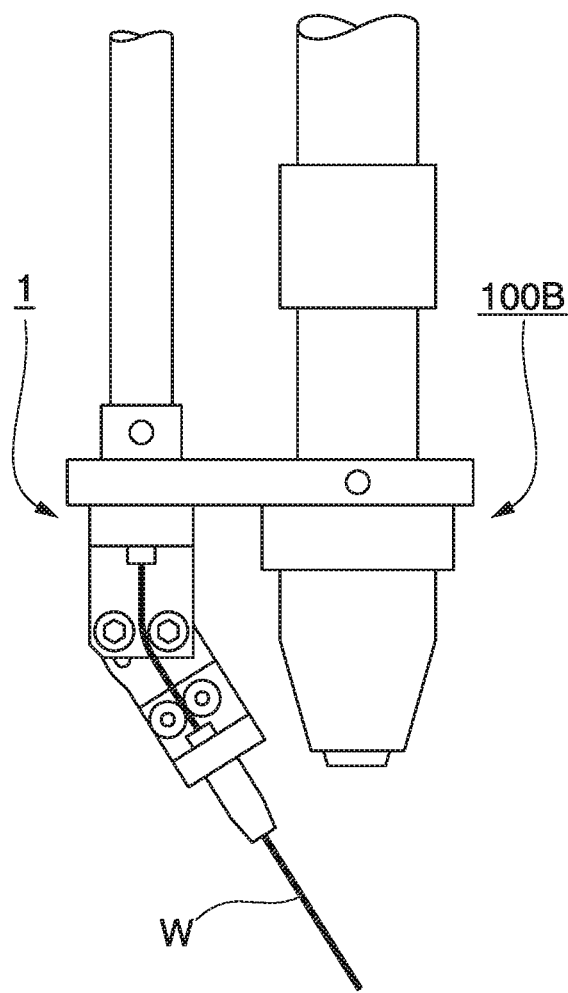
FIG. 14B is a plan view showing another welding torch attached with the wire aiming guide as a fifth modified embodiment.

In the fifth modified embodiment, as the welding torch to which the wire aiming guide 1 is attached, not only the above-described TIG welding torch 100, but also the MIG/MAG welding torch 100 A shown in FIG. 14A or the plasma arc welding torch 100B shown in FIG. 14B can be used.

In addition, as the welding method, not only a hot wire welding that supplies an electric current to the welding wire W but also a cold wire welding that does not flow a current to the welding wire, or a method combining the hot wire welding and the cold wire welding may be used.

Furthermore, examples of the welding method include consumable electrode type welding such as MAG welding or MIG welding, non-consumable electrode type welding such as TIG welding or plasma welding, laser welding using laser light, and composite welding combining them.

In particular, when the outer diameter of the welding wire W is Φ1.0 mm or more, since the welding wire W becomes harder, workability can be improved by using the wire aiming guide 1, 1 A of the present embodiments.

Further, the welding torch to which the present invention is applied is not necessarily limited to the single nozzle structure for emitting the shielding gas from the torch nozzle. For example, it is also possible to adopt a double nozzle structure in which an inert gas is discharged from an inner torch nozzle (inner nozzle) as the shielding gas and an oxidizing gas is discharged from an outer torch nozzle (outer nozzle) located outside the inner torch nozzle.

As for the welding torch to which the present invention is applied, either an air cooling type or a water cooling type can be adopted. In the case of the water cooling type, it is possible to forcibly cool the welding torch by circulating a cooling liquid flowing in the welding torch by the cooling device connected to the welding power supply device.

(Modification 6)

Figure 15:
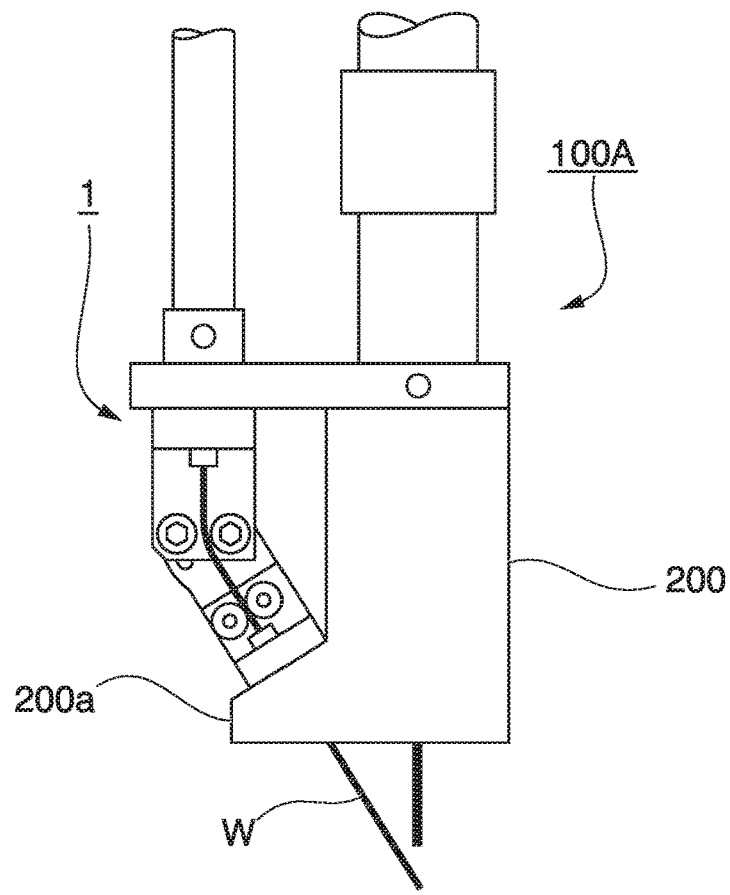
FIG. 15 is a plan view showing an after-shield structure of the welding torch attached with the wire aiming guide shown in FIG. 2 as a sixth modified embodiment.

In a sixth modified embodiment as shown in FIGS. 15 and 16, an after-shield structure in which the periphery of the weld bead after welding is surrounded by an outer nozzle 200 can be adopted in the structure (welding apparatus) in which the wire aiming guide 1 is attached with the MIG/MAG welding torch 100 A shown in FIG. 14A described above.

Specifically, as shown in FIG. 15, the outer nozzle 200 is provided so as to extend from a position surrounding the torch nozzle 105 to a position surrounding the periphery of the weld bead toward the rear in the welding line direction. In the wire aiming guide 1, the nozzle portion 8 is arranged from the extended portion 200a of the outer nozzle 200 toward the inner side of the outer nozzle 200.

Figure 16A:
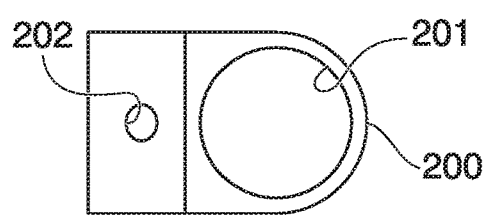
FIG. 16A is a top view showing a configuration of an outer nozzle shown in FIG. 15.

For the outer nozzle 200, for example, it is possible to adopt a configuration as shown in FIGS. 16A to 16F. Specifically, as shown in FIG. 16A, it is possible to adapt a configuration in which the periphery of a hole portion 201 through which the torch nozzle 105 is passed is formed in a cylindrical shape, the extension portion 200a is formed in a rectangular tubular shape, and a hole portion 202 through which the nozzle portion 8 is passed is formed at the extended portion 200a.

Figure 16B:
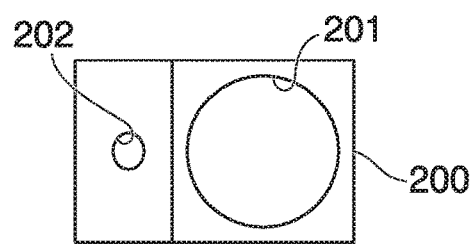
FIG. 16B is a top view showing another configuration of an outer nozzle shown in FIG. 15.

Further, as shown in FIG. 16B, it is possible to adapt a configuration in which the perimeter of the hole portion 201 through which the torch nozzle 105 is passed is formed in a rectangular tubular shape, the extension portion 200a is formed in a rectangular tubular shape, and the hole section 202 through which the nozzle portion 8 is passed is formed at the extension portion 200a.

Figure 16C:
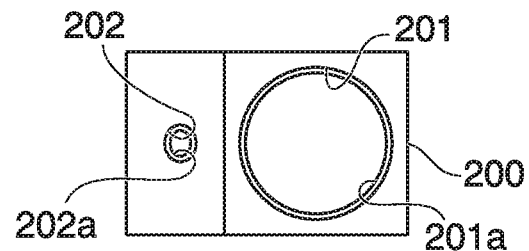
FIG. 16C is a top view showing another configuration of an outer nozzle shown in FIG. 15.

Further, as shown in FIG. 16C, in addition to the configuration of FIG. 15B, an insulating materials 201a, 202a can be disposed around the hole portions 201, 202.

Figure 16D:
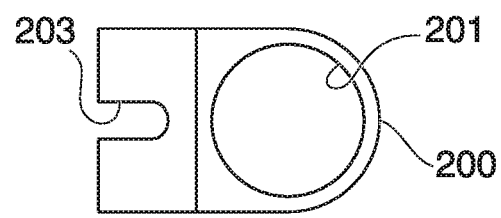
FIG. 16D is a top view showing another configuration of an outer nozzle shown in FIG. 15.

Further, as shown in FIG. 16D, it is possible to adopt a configuration in which the periphery of the hole portion 201 through which the torch nozzle 105 is passed is formed in a cylindrical shape, the extension portion 200a is formed in a rectangular tubular shape, and a slit 203 through which the nozzle portion 8 is passed is formed at the extension portion 200a.

Figure 16E:
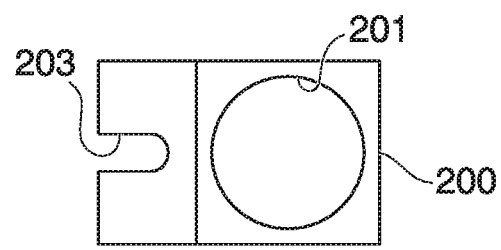
FIG. 16E is a top view showing another configuration of an outer nozzle shown in FIG. 15.

Further, as shown in FIG. 16E, it is possible to adopt a configuration in which the periphery of the hole portion 201 through which the torch nozzle 105 is passed is formed in a rectangular tubular shape, the extension portion 200a is formed in a rectangular tubular shape, and the slit 203 through which the nozzle portion 8 is passed is formed at the extension portion 200a.

Figure 16F:
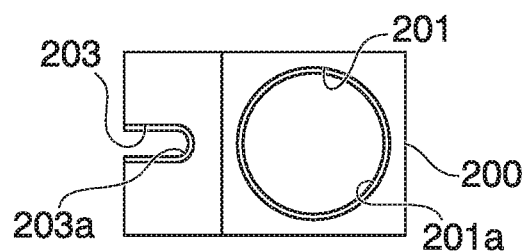
FIG. 16F is a top view showing another configuration of an outer nozzle shown in FIG. 15.

Further, as shown in FIG. 16F, in addition to the configuration of FIG. 15E, it is possible to arrange an insulating materials 201a, 203a around the hole portion 201 and the slit 203.

(Modification 7)

In a seventh modified embodiment, as shown in FIG. 17 and FIGS. 18A to 18C, an after-shield structure in which the periphery of the weld bead after welding is surrounded by the outer nozzle 300 can be adopted in the structure (welding apparatus) in which the wire aiming guide 1 is attached with the MIG/MAG welding torch 100 A shown in FIG. 14A described above.

Figure 17:
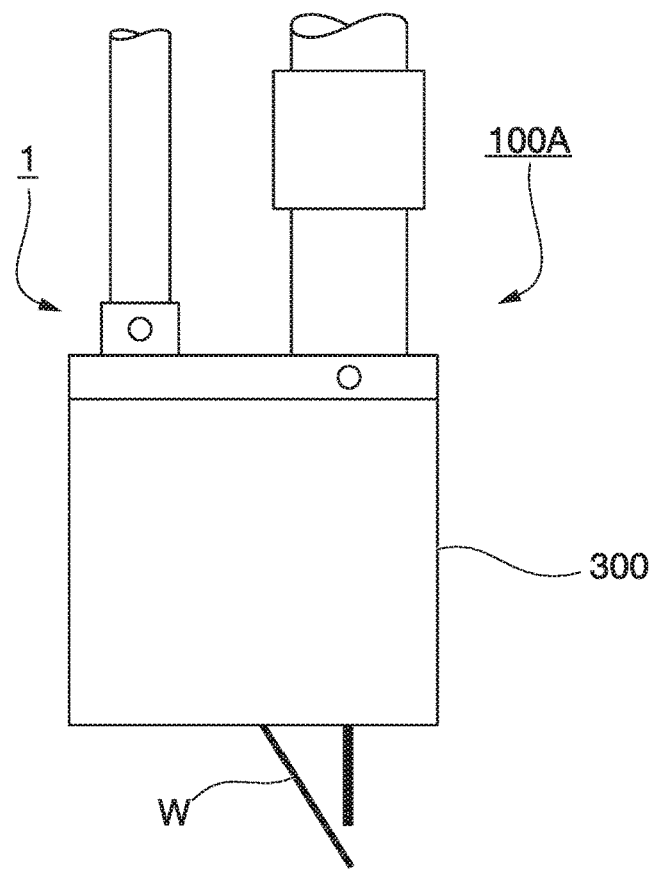
FIG. 17 is a plan view showing an after-shield structure of the welding torch attached with the wire aiming guide as a seventh modified embodiment.

Specifically, as shown in FIG. 17, the outer nozzle 300 is formed in a cylindrical shape from a position surrounding the torch nozzle 105 to a position surrounding the periphery of the weld bead toward the rear in the welding line direction. The wire aiming guide 1 is arranged inside the outer nozzle 300 together with the torch nozzle 105.

Figure 18A:
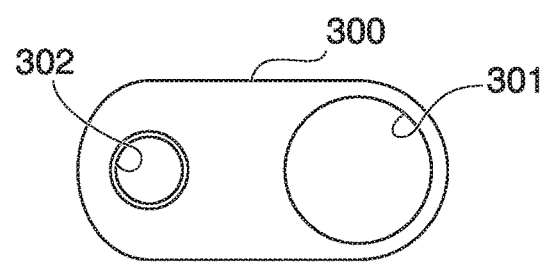
FIG. 18A is a top view showing a configuration of an outer nozzle shown in FIG. 17.
Figure 18B:
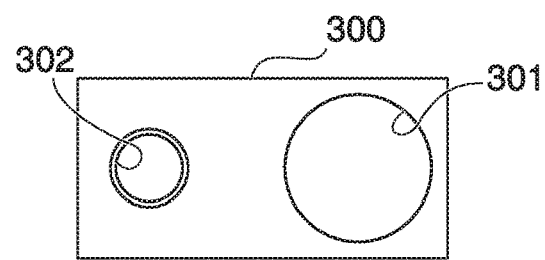
FIG. 18B is a top view showing another configuration of an outer nozzle shown in FIG. 17.
Figure 18C:
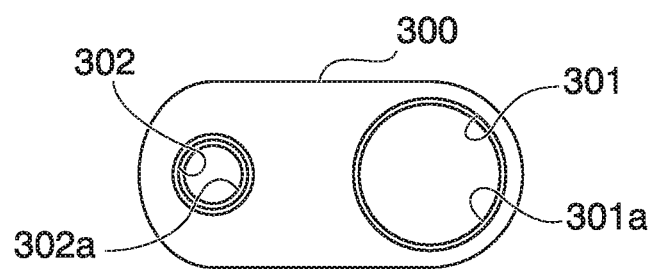
FIG. 18C is a top view showing another configuration of an outer nozzle shown in FIG. 17.

For the outer nozzle 300, it is possible to adopt a configuration as shown in FIGS. 18A to 18C. Specifically, as shown in FIG. 18A, it is possible to adapt a configuration in which a hole portion 301 through which the torch nozzle 105 is passed and a hole portion 302 through which the wire aiming guide 1 is passed are formed, and the periphery thereof is formed in an elliptical tubular shape.

Further, as shown in FIG. 18B, it is possible to adopt a configuration in which the hole portion 301 through which the torch nozzle 105 is passed and a hole portion 302 through which the wire aiming guide 1 is passed are formed, and the periphery thereof is formed in a rectangular tubular shape.

Further, as shown in FIG. 18C, in addition to the configuration of FIG. 17B, it is possible to arrange an insulating material 301a, 302a around the hole 301, 302.

(Modification 8)

Figure 19:
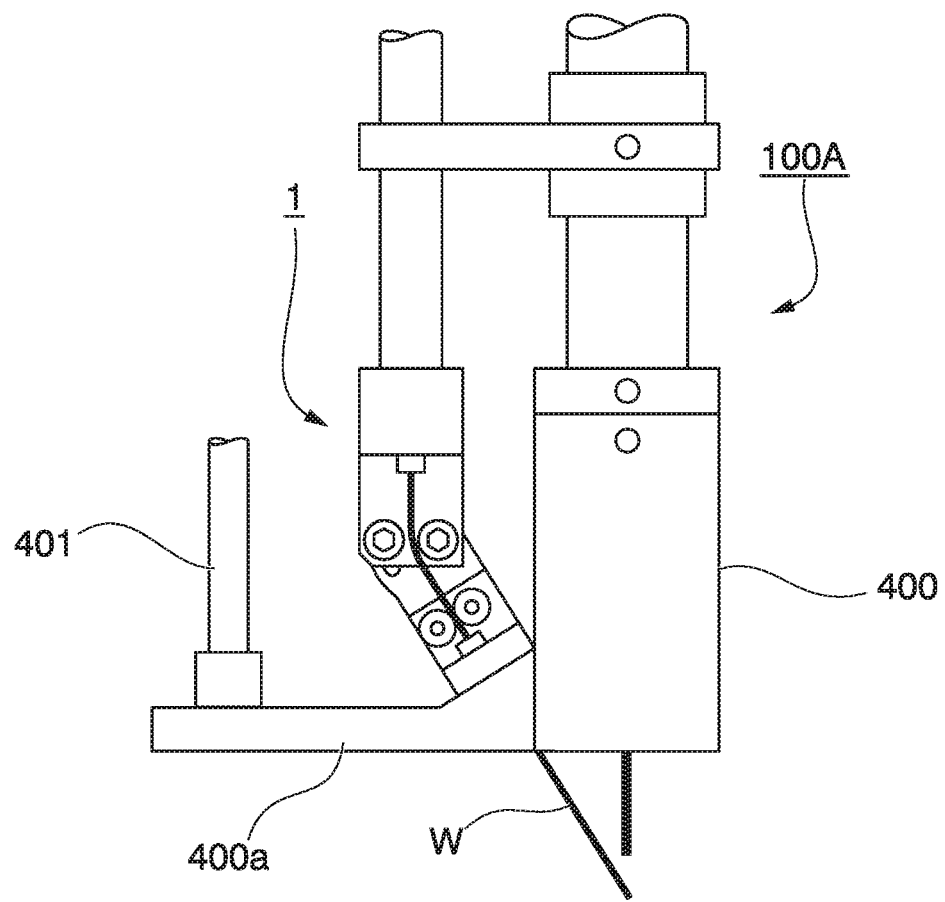
FIG. 19 is a plan view showing an after-shield structure of the welding torch attached with the wire aiming guide as an eighth modified embodiment.

In the eighth modified embodiment, as shown in FIG. 19, it is possible to adapt a configuration in which the outer nozzle 400 surrounds the periphery of the weld bead after welding and a second shield gas is introduced in a structure (welding apparatus) in which the wire aiming guide 1 is attached with the MIG/MAG welding torch 100 A shown in FIG. 14A described above.

Specifically, as shown in FIG. 19, the outer nozzle 400 is extended from a position surrounding the torch nozzle 105 to a position surrounding the periphery of the weld bead toward the rear in the welding line direction. In the wire aiming guide 1, the nozzle portion 8 is disposed from the extension portion 400a of the outer nozzle 400 toward the inside of the outer nozzle 400. Further, a hose 401 for introducing the second shielding gas is connected to the extended portion 400a of the outer nozzle 400.

Second Embodiment

Figure 20:
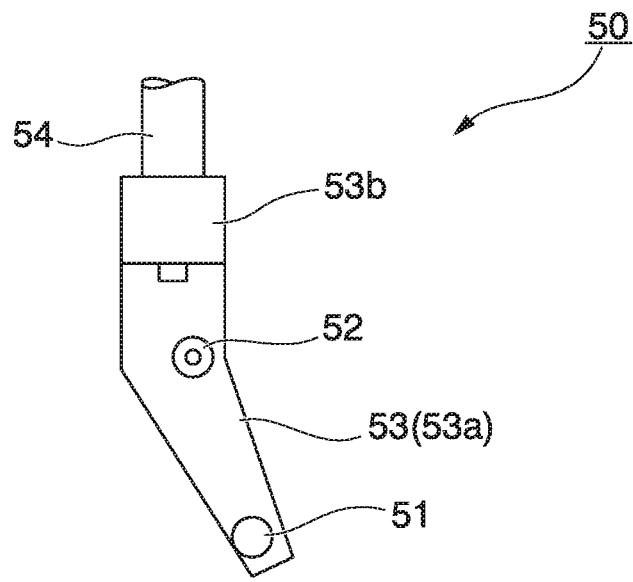
FIG. 20 is a plan view showing a configuration of a wire aiming guide according to a second embodiment of the present invention.
Figure 21:
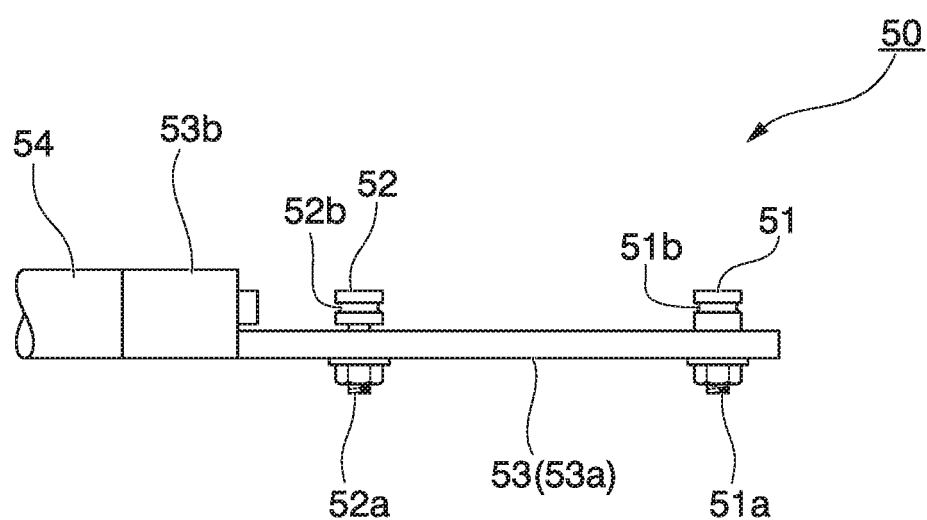
FIG. 21 is a side view showing a configuration of a wire aiming guide shown in FIG. 20.

Next, a wire aiming guide 50 shown in FIGS. 20 and 21 will be described as a second embodiment of the present invention. FIG. 20 is a plan view showing the configuration of the wire aiming guide 50. FIG. 21 is a side view showing the configuration of the wire aiming guide 50. Further, in the following description, the same parts as those of the wire aiming guide 1 are not described, and the same reference numerals are attached in the drawings.

As shown in FIGS. 20 and 21, the wire aiming guide 50 includes a guide member 53 including a first guide portion 51 and a second guide portion 52 which guide the welding wire W, and a liner 54 configured to feed the welding wire W in a state of being connected to the base end side of the guide member 53.

The guide member 53 is formed in a substantially rectangular flat plate shape using a material having excellent electrical conductivity and thermal conductivity such as copper and a copper alloy. Further, the guide member 53 has a shape in which the tip end side is bent toward first side in the plane with respect to the base end side.

The first guide portion 51 is positioned on the tip end side of the guide member 53 with respect to the second guide portion 52 and is located biased with respect to the extension direction of the welding wire W fed from the liner 54 than the second guide portion 52. That is, the first guide portion 51 provided at the tip end side of the guide member 53 which is bent. On the other hand, the second guide portion 52 is located at a position along the extension direction of the welding wire W fed from the liner 54 on the base end side of the guide member 53.

The first guide portion 51 is a guide pin, and the shaft portion 51a thereof is attached to one surface of the main body portion 53a constituting the guide member 53 by screws, and thereby being supported in a state of protruding from one surface of the main body portion 53a. A guide groove 51b configured to guide the welding wire W is provided in the first guide portion 51.

The first guide portion 51 is formed using a material having excellent electrical conductivity and thermal conductivity such as copper or a copper alloy. As a result, the first guide portion 51 comes into contact with the welding wire W as a power feeding portion. When the first guide portion 51 does not need a function as a power supply portion, the first guide portion 51 may be formed using an insulator.

The second guide portion 52 is a guide roller, and a shaft portion 52a thereof is attached to one surface of the main body portion 53a constituting the guide member 53 by screwing so that the guide roller is supported rotatably in a plane parallel to one surface of the main body portion 53a.

A guide groove 52b configured to guide the welding wire W is provided on the outer peripheral surface of the second guide portion 52. The outer peripheral surface of the second guide portion 52, that is, the portion in contact with the welding wire W is made of an insulator such as ceramic or resin so that no current flows due to contact with the welding wire W. Moreover, the outer peripheral surface of the second guide portion 52, that is, the portion in contact with the welding wire W, may be made of metal. However, when it is necessary to insulate the welding wire W from the second guide portion 52, it is desirable that the portion in contact with the welding wire W described above is an insulator such as ceramic or resin.

The liner 54 can be detachably attached to the extension portion 53b extending in the axial direction on the base end side of the guide member 53 by threaded engagement. Further, the liner 54 is connected to a wire feeding device (not shown in figures), and the welding wire W can be automatically fed by the wire feeding device.

Although not shown in the figures, the wire aiming guide 50 includes an attaching portion configured to attach the guide member 53 to the TIG welding torch 100. The attaching portion is an attachment jig attached to the extension portion 53b of the guide member 53 and has the same configuration as the attaching portion 7.

The wire aiming guide 50 having the above structure is attached to the TIG welding torch 100 via the attaching portion so that the torch nozzle 105 and the guide member 53 are aligned. Thereby, a welding device including the TIG welding torch 100 and the wire aiming guide 50 is constituted.

Figure 22A:
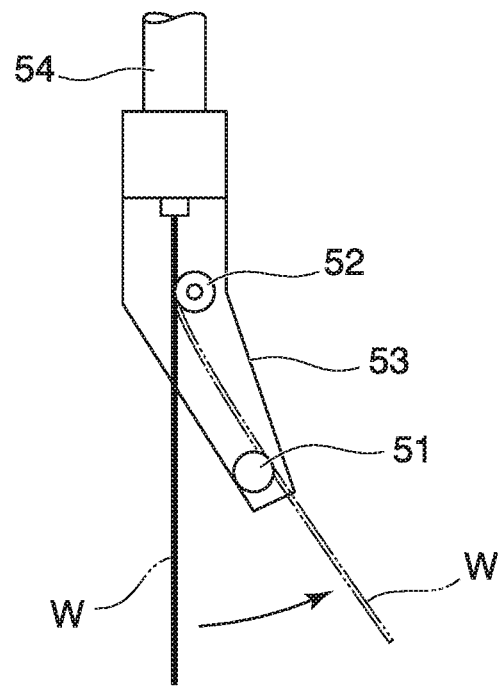
FIG. 22A is a plan view showing a state before the welding wire W is hooked to the wire aiming guide shown in FIG. 20.
Figure 22B:
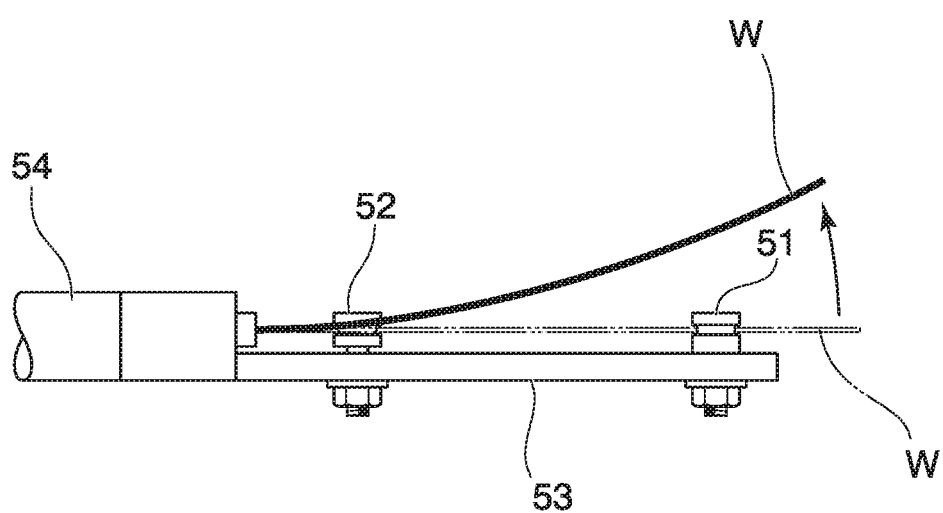
FIG. 22B is a side view showing a state before the welding wire W is hooked to the wire aiming guide shown in FIG. 20.
Figure 23A:
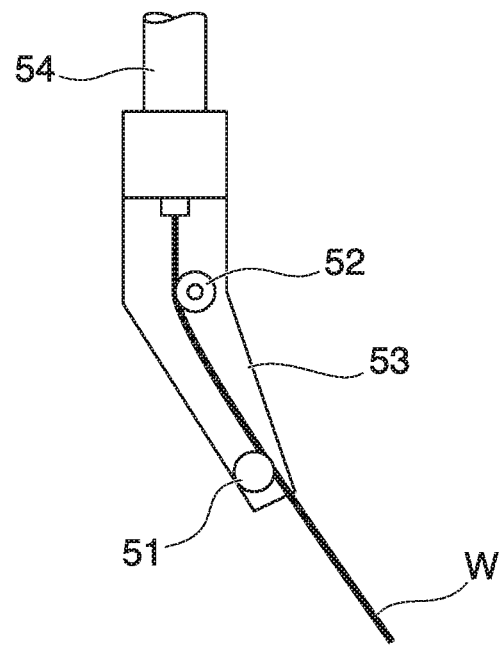
FIG. 23A is a plan view showing a state after the welding wire W is hooked to the wire aiming guide shown in FIG. 20.
Figure 23B:
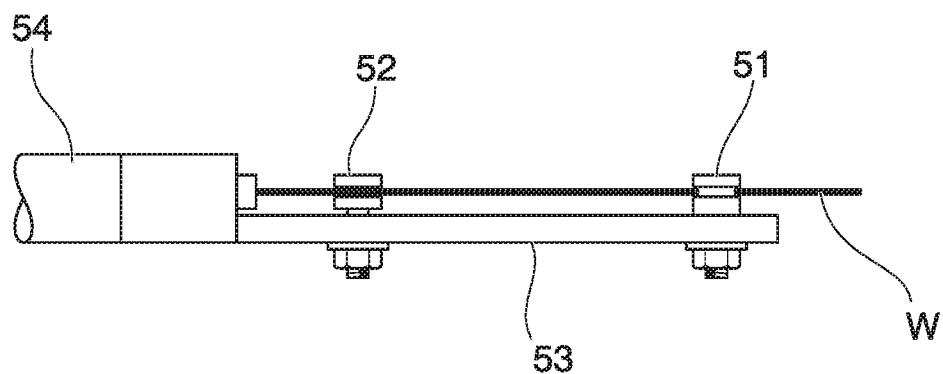
FIG. 23B is a side view showing a state after the welding wire W is hooked to the wire aiming guide shown in FIG. 20.

In the wire aiming guide 50 according to the present embodiment, the welding wire W is bent with the second guide portion 52 as a fulcrum from the state shown in FIGS. 22A and 22B to the state shown in FIGS. 23A and 23B, the welding wire W is lifted with fingers, and hooked to the first guide portion 51. As a result, it is possible to feed the welding wire W from the tip end side of the guide member 53 while guiding the welding wire W.

Moreover, FIG. 22A is a plan view showing a state before the welding wire W is hooked to the wire aiming guide shown in FIG. 20. FIG. 22B is a side view showing a state before the welding wire W is hooked to the wire aiming guide shown in FIG. 20. FIG. 23A is a plan view showing a state after the welding wire W is hooked to the wire aiming guide shown in FIG. 20. FIG. 23B is a side view showing a state after the welding wire W is hooked to the wire aiming guide shown in FIG. 20.

As described above, in the wire aiming guide 50 of the present embodiment, it is possible to accurately supply the welding wire W in the state shown in FIG. 23A and FIG. 23B to the molten pool directly under the arc. Furthermore, as compared with a conventional configuration in which a rotating mechanism is provided with an attachment jig to adjust the angle of the wire aiming guide, since the space around the nozzle of the TIG welding torch 100 which is necessary for welding can be reduced, it is easy to approach the narrow portion.

Furthermore, in the wire aiming guide 50 of the present embodiment, while the welding wire W is hooked to the first guide portion 51, the welding wire W can be reliably brought into contact with the guide groove 51b of the first guide portion 51. In this case, in the hot wire that passes the current in the welding wire W, since the position (power supply portion) of the welding wire W which is in contact with the nozzle portion 8 is fixed, it is possible to suppress the fluctuation of the electric resistance between the feeding portion on the side of the wire aiming guide 50 and the workpiece (base material), and perform welding in a stable state.

Moreover, the present invention is not necessarily limited to the configuration of the wire aiming guide 1, and various modifications can be made without departing from the spirit of the present invention.

For example, the angle of the first guide member 2 with respect to the second guide member 3 is adjusted, and the orientation of the welding wire W can be changed (adjusted) by substituting the guide member 53 with the first guide member 2 and the second guide member 3 which are rotatably connected via the above-described connecting portion 5.

That is, in the present invention, it is possible to hook the welding wire W on the first guide portion 51 instead of passing the welding wire W through the nozzle portion 8. Thereby, it is possible to apply the same configuration as the above-mentioned wire aiming guide 50 to each of the modified embodiments 1 to 8 of the wire aiming guide 1 described above.

EXPLANATION OF REFERENCE NUMERALS 1, 1A: wire aiming guide (first embodiment)
2: first guide member
3: second guide member
4: liner
5: connecting portion
6: fixing portion
7: attaching portion
8: nozzle portion
9: first guide roller (first guide portion)
10: second guide roller (second guide portion)
11: first connecting piece
12: second connecting piece
13: supporting bolt
14: first shaft hole
15: second shaft hole
16: nut
17: fixing bolt
18: guide slit
18A: guide portion
18B: positioning hole
18C: guide groove
19: third shaft hole
20: nut
21: insulating tube
50: wire aiming guide (second embodiment)
51: first guide portion
52: second guide portion
53: guide member
54: liner
100, 100A, 100B: welding torch
200: outer nozzle
300: outer nozzle
C: welding cable
W: welding wire

The invention claimed is:

1. A wire aiming guide configured to guide a welding wire and feed the welding wire from a tip side thereof while being attached to a welding torch comprising:
    a first guide member and a second guide member configured to guide the welding wire:
    a connecting portion rotatably connecting the first guide member and the second guide member; and
    a fixing portion configured to fix the first guide member to the second guide member;
    wherein a direction of the welding wire fed from a tip end side of the first guide member is adjusted by bending the first guide member with respect to the second guide member, and
    the fixing portion includes:
        a fixing bolt;
        a guide slit which is configured to allow the fixing bolt to pass therethrough and is formed on the first guide member;
        a third shaft hole which is configured to allow the fixing bolt to pass therethrough and is formed on the second guide member; and
        a nut which is configured to fasten to a tip end side of a shaft portion of the fixing bolt.

2. The wire aiming guide according to claim 1, wherein a nozzle portion configured to penetrate the welding wire is provided on the tip side of the first guide member, and the welding wire is fed out from the tip of the nozzle portion.

3. The wire aiming guide according to claim 1, wherein a first guide portion configured to guide the welding wire toward the nozzle portion side is provided with the first guide member.

4. The wire aiming guide according to claim 3, wherein the first guide portion is positioned on both side of the welding wire so as to sandwich the welding wire, and the welding wire is guided toward the nozzle portion side while being sandwiched by the first guide portion.

5. The wire aiming guide according to claim 1, wherein the wire aiming guide further includes a liner configured to feed the welding wire in a state of being connected to a base end side of the second guide member.

6. The wire aiming guide according to claim 5, wherein the second guide member is provided with a second guide portion configured to guide the welding wire fed from the liner.

7. The wire aiming guide according to claim 6, wherein the second guide portion is positioned on both sides of the welding wire so as to sandwich the welding wire, and the welding wire is guided toward the first guide member side in a state of being sandwiched by the second guide portion.

8. The wire aiming guide according to claim 1, wherein the wire aiming guide further includes an attaching portion configured to attach the second guide member to the welding torch.

9. A welding device comprising a welding torch and a wire aiming guide according to claim 1.

* * * * *